(12) United States Patent
Tezuka et al.

(10) Patent No.: US 8,237,820 B2
(45) Date of Patent: Aug. 7, 2012

(54) IMAGE SYNTHESIS DEVICE FOR GENERATING A COMPOSITE IMAGE USING A PLURALITY OF CONTINUOUSLY SHOT IMAGES

(75) Inventors: Tadanori Tezuka, Fukuoka (JP); Ikuo Fuchigami, Fukuoka (JP)

(73) Assignee: Panasonic Corporation, Osaka (JP)

( * ) Notice: Subject to any disclaimer, the term of this patent is extended or adjusted under 35 U.S.C. 154(b) by 491 days.

(21) Appl. No.: 12/532,886

(22) PCT Filed: Dec. 26, 2008

(86) PCT No.: PCT/JP2008/004027
§ 371 (c)(1),
(2), (4) Date: Sep. 24, 2009

(87) PCT Pub. No.: WO2009/098749
PCT Pub. Date: Aug. 13, 2009

(65) Prior Publication Data
US 2010/0039519 A1    Feb. 18, 2010

(30) Foreign Application Priority Data

Feb. 4, 2008 (JP) .................................. 2008-023595

(51) Int. Cl.
H04N 5/262 (2006.01)
(52) U.S. Cl. ..................................... 348/239; 348/222.1
(58) Field of Classification Search ............... 348/220.1, 348/459, 222.1, 362, 229.1, 223.1, 239; 382/107, 382/284; 375/240.25
See application file for complete search history.

(56) References Cited

U.S. PATENT DOCUMENTS

| 7,557,833 | B2* | 7/2009 | Okawa ........................ 348/220.1 |
| 2005/0052551 | A1 | 3/2005 | Tsunoda |
| 2006/0061672 | A1 | 3/2006 | Nitta |
| 2006/0062433 | A1* | 3/2006 | Ikeda ............................ 382/107 |
| 2007/0127574 | A1* | 6/2007 | Yao et al. ................. 375/240.16 |
| 2007/0229699 | A1* | 10/2007 | Hamamura et al. .......... 348/362 |
| 2008/0024619 | A1* | 1/2008 | Ono .......................... 348/222.1 |
| 2009/0103630 | A1* | 4/2009 | Fuchikami et al. ....... 375/240.25 |
| 2009/0201418 | A1* | 8/2009 | Endo et al. .................... 348/453 |
| 2009/0244317 | A1* | 10/2009 | Makii ........................ 348/229.1 |
| 2009/0268089 | A1* | 10/2009 | Mori et al. .................... 348/459 |
| 2010/0265357 | A1* | 10/2010 | Liu et al. .................... 348/223.1 |

FOREIGN PATENT DOCUMENTS

| EP | 1 956 839 | 8/2008 |
| JP | 2005-86228 | 3/2005 |
| JP | 2005-268912 | 9/2005 |

(Continued)

OTHER PUBLICATIONS

Machine English Translation of JP 2007-166198 A (Jun. 28, 2007).*

(Continued)

Primary Examiner — Nelson D. Hernández Hernández
(74) Attorney, Agent, or Firm — Wenderoth, Lind & Ponack, L.L.P.

(57) ABSTRACT

The frame interpolation unit generates an interpolation image for interpolating in a non-photographic section that is between one exposure section in which exposure occurs and a next exposure section, with use of photographed images in both exposure sections temporally adjacent to the non-photographing section. The frame compositing circuit generates a composite image corresponding to a predetermined time section with use of a photographed image photographed in the predetermined time section and the interpolation image generated by the frame interpolation circuit.

10 Claims, 12 Drawing Sheets

FOREIGN PATENT DOCUMENTS

| | | |
|---|---|---|
| JP | 2006-94058 | 4/2006 |
| JP | 2006-339903 | 12/2006 |
| JP | 2007-166198 | 6/2007 |
| WO | 03/060823 | 7/2003 |
| WO | 2007-063819 | 6/2007 |

OTHER PUBLICATIONS

International Search Report issued Feb. 17, 2009 in International (PCT) Application No. PCT/JP2008/004027.

* cited by examiner

FIG. 12

Please specify continuous shooting interval.

Δ t =  | 0.3 |  Seconds   9A

IMAGE SYNTHESIS DEVICE FOR GENERATING A COMPOSITE IMAGE USING A PLURALITY OF CONTINUOUSLY SHOT IMAGES

TECHNICAL FIELD

The present invention relates to technology for generating composite images with use of a plurality of continuously shot photographed images.

BACKGROUND ART

Among conventional photographing devices such as digital still cameras, there are some that have a function of continuously shooting a plurality of images, and furthermore have a function of generating still images by compositing all or some of the continuously shot images. Note that in the following description, consecutively shooting a plurality of photographs is called "continuous shooting". For example, patent document 1 discloses a technique in which a plurality of images shot by continuous shooting are temporarily recorded in a buffer, and by compositing some of the images recorded temporarily in the buffer, a composite image is generated that is on a par with a still image having a changed shutter speed. Note that "shutter speed" corresponds to "exposure time", that is, "duration of an exposure section in which exposure occurs".

Patent document 1: Japanese Patent Application Publication No. 2005-86228

SUMMARY OF THE INVENTION

Problems Solved by the Invention

Meanwhile, when a time interval at which continuous shooting is performed (hereinafter referred to as a "continuous shooting interval") is longer than the shutter speed, a section in which exposure does not occur (hereinafter referred to as a "non-photographing section") is present between one exposure section, in which exposure occurs, and the next exposure section (see FIG. 1B).

However, since the plurality of photographed images shot by continuous shooting are merely image-composited in the technique disclosed in patent document 1, when compositing a plurality of photographed images for which the continuous shooting interval is longer than the shutter speed, an image to appear in the non-photographing section may be missing, in other words, an image like a strobe composite image may be obtained. When using a plurality of images shot by continuous shooting in this way, there is an issue of not being able to generate a composite image that approximates a still image having a shutter speed that is slower than the actual shutter speed.

Although the above issue is overcome when the continuous shooting interval and the shutter speed are adjusted to be substantially the same, as described below, the continuous shooting interval and the shutter speed can not always be adjusted to be the same. There are times when the shutter speed must be shorter than the continuous shooting interval to fit the exposure, even if an aperture is adjusted to be as small as possible, especially in a case of photographing in a well-lit place such as in the daylight, since the shooting interval is constrained by the capability of the photographing device.

In view of this, the present invention aims to provide an image compositing device, image compositing method, image compositing program, integrated circuit, imaging system and imaging method for generating composite images that approximate still images that would be obtained by photographing in an exposure time that is longer than the actual exposure time, using photographed images shot by continuous shooting in a longer time interval than the exposure time.

Means to Solve the Problems

In order to solve the above problem, the image compositing device of the present invention is an image compositing device that generates a composite image corresponding to a predetermined time section with use of a plurality of photographed images continuously shot at a predetermined time interval, including: an interpolation unit operable to generate an interpolation image for interpolating in a non-photographing section between an exposure section in which exposure occurs and a next exposure section, with use of photographed images in both exposure sections temporally adjacent to the non-photographing section; and a compositing unit operable to generate a composite image corresponding to the predetermined time section, with use of one or more interpolation images, generated by the interpolation unit, to be interpolated in the predetermined time section, and one or more photographed images photographed in the predetermined time section, so that respective pixels in a same position, in the one or more photographed images and the one or more interpolation images, substantially overlap with each other.

Also, the image compositing method of the present invention is an image compositing method of generating a composite image corresponding to a predetermined time section with use of a plurality of photographed images continuously shot at a predetermined time interval, including the steps of: generating an interpolation image for interpolating in a non-photographing section between an exposure section in which exposure occurs and a next exposure section, with use of photographed images in both exposure sections temporally adjacent to the non-photographing section; and generating a composite image corresponding to the predetermined time section, with use of one or more interpolation images, generated by the interpolation unit, to be interpolated in the predetermined time section, and one or more photographed images photographed in the predetermined time section, so that respective pixels in a same position, in the one or more photographed images and the one or more interpolation images, substantially overlap with each other.

Furthermore, the image compositing program of the present invention is an image compositing program that causes a computer, as an image compositing device that generates a composite image corresponding to a predetermined time section with use of a plurality of photographed images continuously shot at a predetermined time interval, to execute the steps of: generating an interpolation image for interpolating in a non-photographing section between an exposure section in which exposure occurs and a next exposure section, with use of photographed images in both exposure sections temporally adjacent to the non-photographing section; and generating a composite image corresponding to the predetermined time section, with use of one or more interpolation images, generated by the interpolation unit, to be interpolated in the predetermined time section, and one or more photographed images photographed in the predetermined time section, so that respective pixels in a same position, in the one or more photographed images and the one or more interpolation images, substantially overlap with each other.

Furthermore, the integrated circuit of the present invention is an integrated circuit that generates a composite image corresponding to a predetermined time section with use of a plurality of photographed images continuously shot at a predetermined time interval, including: an interpolation unit operable to generate an interpolation image for interpolating in a non-photographing section between an exposure section in which exposure occurs and a next exposure section, with use of photographed images in both exposure sections temporally adjacent to the non-photographing section; and a compositing unit operable to generate a composite image corresponding to the predetermined time section, with use of one or more interpolation images, generated by the interpolation unit, to be interpolated in the predetermined time section, and one or more photographed images photographed in the predetermined time section, so that respective pixels in a same position, in the one or more photographed images and the one or more interpolation images, substantially overlap with each other.

Effects of the Invention

According to the above-described image compositing device, image-compositing method, image compositing program, and integrated circuit, interpolation images for interpolating in a non-photographing section are generated with use of photographed images in both exposure sections temporally adjacent to the non-photographing section, and generation of composite images is performed by adding the interpolation images to the photographed images. This enables using photographed images continually shot in a longer time interval than the duration of the exposure section (exposure time) to generate composite images that approximate still images that would be obtained by photographing in an exposure time that is longer than the actual exposure time.

In the image compositing device, the interpolation unit may generate one or more interpolation images so that an entirety of the non-photographing section is provided with images.

According to this structure, the entire time of the non-photographing section is provided with interpolation images, so that there are no times for which an image is missing.

In the image compositing device, when the duration of the non-photographing section is N times (N being a positive integer) the duration of the exposure section, the interpolation unit may generate N interpolation images.

According to this structure, composite images are generated so that the entire time of the non-photographing section is provided with interpolation images, there are no duplicate times between the photographed images and the interpolation images, and if two or more interpolation images are generated in one non-photographing section, there are also no duplicate times between the interpolation images. This enables generating composite images substantially on a par with still images photographed at an exposure time that is the same as the time section.

In the above-described image compositing device, when the duration of the non-photographing section is not a positive integral multiple of the duration of the exposure section, the interpolation unit may obtain a positive integer N such that (N−1) times the duration of the exposure section is smaller than the duration of the non-photographing section, and N times the duration of the exposure section is larger than the duration of the non-photographing section, and the interpolation unit generates N interpolation images.

According to this structure, composite images are generated so that the entire time of the non-photographing section is provided with interpolation images, while minimizing a temporally duplicated period between photographed images and interpolated images, and if two or more interpolation images are generated in one non-photographing section, a temporally duplicated period among the interpolation images is minimized. This enables generating composite images in such a way that there are no times for which an image is missing, and duplicated periods are minimized, compared to still images that would be obtained by photographing at an exposure time that is the same as the time section.

In the above-described image compositing device, the interpolation unit may perform the generation of the interpolation images by determining a position of a moving portion in an interpolation image to be generated, in accordance with (i) a position, in each of the photographed images of the both exposure sections, that indicates a moving portion that has moved from a position in one of the photographed images to another position in another of the photographed images, and (ii) the number of interpolation images to interpolate in the non-photographing section.

This facilitates generation of interpolation images.

The imaging system of the present invention includes an imaging unit; a control unit that controls continuous shooting by the imaging unit so that a time interval of performing the continuous shooting is a positive integral multiple of a duration of an exposure section in which exposure occurs, an interpolation unit operable to generate an interpolation image for interpolating in a non-photographing section between an exposure section in which exposure occurs and a next exposure section, with use of photographed images in both exposure sections temporally adjacent to the non-photographing section; and a compositing unit operable to generate a composite image corresponding to the predetermined time section, with use of one or more interpolation images, generated by the interpolation unit, to be interpolated in the predetermined time section, and one or more photographed images photographed in the predetermined time section, so that respective pixels in a same position, in the one or more photographed images and the one or more interpolation images, substantially overlap with each other.

Also, the imaging method of the present invention includes the steps of: controlling continuous shooting of an imaging unit so that a time interval of performing the continuous shooting is a positive integral multiple of a duration of an exposure section in which exposure occurs, generating an interpolation image for interpolating in a non-photographing section between an exposure section in which exposure occurs and a next exposure section, with use of photographed images in both exposure sections temporally adjacent to the non-photographing section; and generating a composite image corresponding to the predetermined time section, with use of one or more interpolation images, generated by the interpolation unit, to be interpolated in the predetermined time section, and one or more photographed images photographed in the predetermined time section, so that respective pixels in a same position, in the one or more photographed images and the one or more interpolation images, substantially overlap with each other.

According to the above-described imaging system and imaging method, the continuous shooting is performed so that, when there is a non-photographing section, the duration of the non-photographing section is an integral multiple of the duration of the exposure section. This enables the generation of composite images so that the entire time of the non-photographing section is provided with interpolation images, there are no duplicate times between the photographed images and the interpolation images, and if two or more interpolation images are generated in one non-photographing section, there are also no duplicate times among the interpolation images.

BRIEF DESCRIPTION OF THE DRAWINGS

FIG. 12 shows an example of a GUI for setting a continuous shooting interval, displayed in the continuous shooting processing of FIG. 11.

Figure 1A:
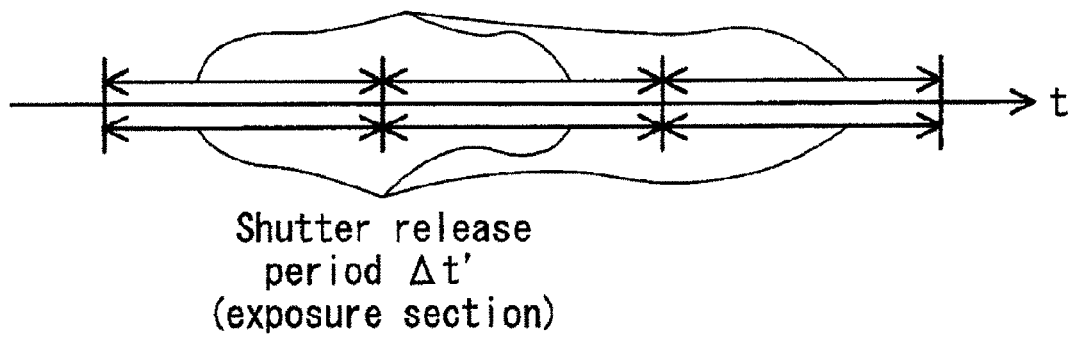
FIGS. 1A and 1B illustrate a relationship between a continuous shooting interval and a shutter release period.

DESCRIPTION OF THE CHARACTERS 1 photographing device
51 CPU
52 memory
53 photographing optics system mechanism
54 focus drive circuit
55 zoom drive circuit
56 aperture drive circuit
57 image sensor
58 image sensor control circuit
59 front end unit
60 DSP
61 frame interpolation circuit
62 frame compositing circuit
63 compression and expansion circuit
64 memory card

DETAILED DESCRIPTION OF THE INVENTION

Embodiment 1

The following describes a photographing device pertaining to embodiment 1 of the present invention, with reference to the drawings.

Relationship Between Continuous Shooting Interval and Shutter Release Period

Before describing the structure and operation of a photographing device 1 of the present invention, the following describes, with reference to FIG. 1, a relationship between a continuous shooting interval and a shutter release period. FIG. 1 illustrates the relationship between the continuous shooting interval and the shutter release period. Note that the "continuous shooting interval" is a "time interval at which continuous shooting occurs". The "shutter release period" is an "exposure time" in which exposure occurs. The time section of the exposure time is an "exposure section". A time section in which a shutter is not released, occurring between one exposure section and the next exposure section, that is, a time section in which exposure does not occur, is a "non-photographing section".

FIG. 1A shows a relationship between a continuous shooting interval $\Delta t$ and a shutter release period $\Delta t'$ when both are equivalent. When the continuous shooting interval $\Delta t$ and the shutter release period $\Delta t'$ are equivalent ($\Delta t = \Delta t'$), the exposure section is temporally continuous, and a non-photographing section is not present.

Figure 1B:
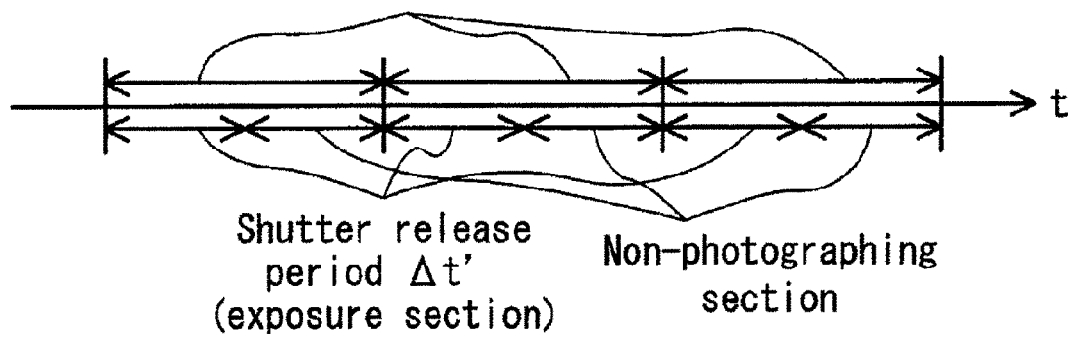

FIG. 1B shows a relationship between the continuous shooting interval $\Delta t$ and the shutter release period $\Delta t'$ when the continuous shooting interval $\Delta t$ is longer than the shutter release period $\Delta t'$. When the continuous shooting interval $\Delta t$ is longer than the shutter release period $\Delta t'$ ($\Delta t > \Delta t'$), there is a non-photographing section of a period $\Delta t - \Delta t'$ in which the shutter is not released, in other words, exposure does not occur, between one exposure section and the next exposure section.

The central aim of the present invention is to generate a composite image corresponding to a predetermined time section with use of photographed images shot by continuous shooting at a time interval that is longer than the exposure time. Therefore, the following description mainly describes a case in which the "continuous shooting interval" corresponding to the "time interval" of continuous shooting is longer than the "shutter release period" corresponding to the "duration of an exposure section during which exposure occurs (exposure time). Note that an image to be interpolated in the non-photographic section is called an "interpolation image".

Outward Appearance of Photographing Device

Figure 2A:
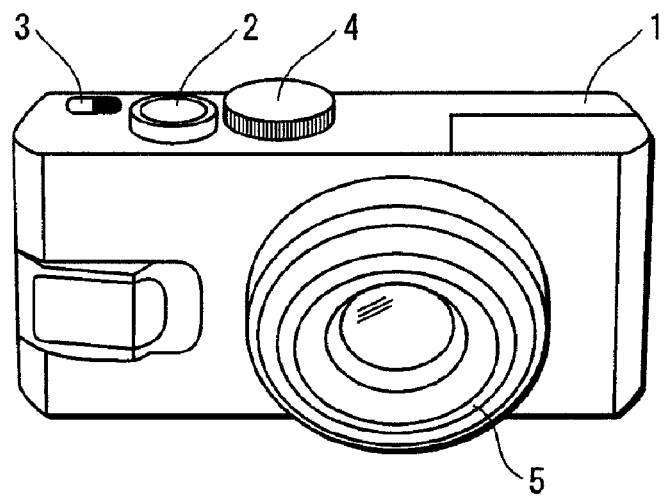
FIG. 2A is a front view of the photographing device of embodiment 1.
Figure 2B:
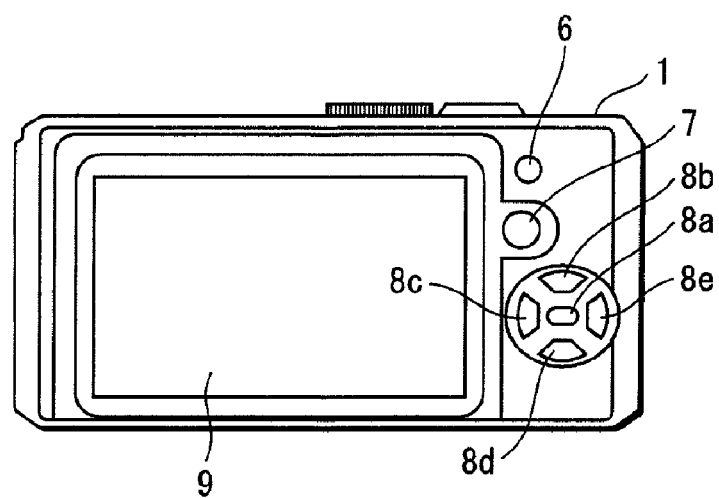
FIG. 2B is a back view of the photographing device.

The following describes the outward appearance of the photographing device 1 of the present embodiment with reference to FIGS. 2A and 2B. FIG. 2A is a front view of the photographing device 1 of the present embodiment, and FIG. 2B is a back view thereof.

The upper face of the photographing device 1 is provided with a photographing button 2 for photographing instruction, a continuous shooting mode switch 3 for continuous shooting setting, and a mode dial 4. A lens 5 is provided on the front of the photographing device 1. Also, the back of the photographing device 1 is provided with a focus exposure fixing button 6, a function button 7, a center key 8a, up, down, left, and right directional push-keys 8b to 8e, and furthermore, a liquid crystal monitor 9.

Functional Structure of Photographing Device

The photographing device 1 of FIG. 2 generates one or more interpolation images for interpolating in the non-photographing section with use of photographed images of both exposure sections temporarily adjacent to the non-photographing section. The photographing device 1 generates a composite image for a predetermined time section with use of photographed images and interpolated images in the predetermined time section. In the present embodiment, the predetermined time section is specified by a user, and in the following description, the "predetermined time section" is referred to as the "image compositing section".

Figure 3:
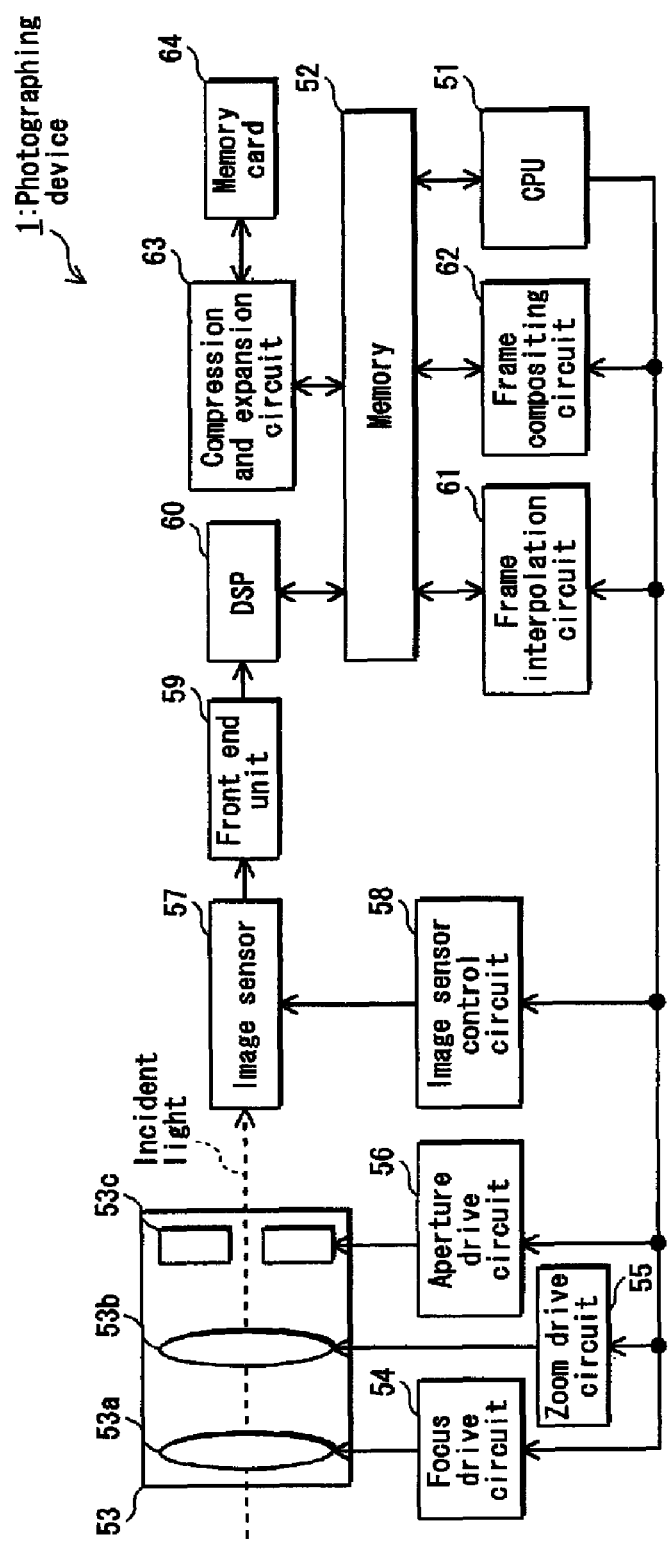
FIG. 3 is a functional block diagram of the photographing device of FIG. 2.

The following describes the functional structure of the photographing device 1 of FIG. 2 with reference to FIG. 3. FIG. 3 is a functional block diagram of the photographing device 1 of FIG. 2.

The photographing device 1 includes a CPU (Central Processing Unit) 51, a memory 52, a photographing optical system including a main lens 53a, a zoom lens 53b, and an aperture 53c, a focus drive circuit 54, a zoom drive circuit 55, an aperture drive circuit 56, an image sensor 57, an image sensor control circuit 58, a front end unit 59, a DSP (Digital Signal Processor) 60, a frame interpolation circuit 61, a frame compositing circuit 62, a compression and expansion circuit 63, and a memory card 64 such as an SD card or CompactFlash (registered trademark) memory.

The CPU 51 performs control of the entire photographing device 1. The memory 52 is a semiconductor memory, for example. Various control programs for controlling the photographing device 1 and various application programs, etc. are recorded in the memory 52. Also, image data, etc. is recorded in the memory 52.

The focus drive circuit 54, the zoom drive circuit 55, and the aperture drive circuit 56 are controlled by the CPU 51. Also, the main lens 53a of the photographing optical system mechanism 53 is driven by the focus drive circuit 54. The zoom lens 53b is driven by the zoom drive circuit 55, and the aperture 53c is driven by the aperture drive circuit 57. Incident light from the photographic subject is guided to the image sensor 57 by the main lens 53a, the zoom lens 53b, and the aperture 53c.

The image sensor 57 includes a CCD (Charge Coupled Device) image sensor, a CMOS (Complementary Metal Oxide Semiconductor) image sensor, or the like. For example, the continuous shooting interval $\Delta t$ and the shutter release period $\Delta t'$ are set by the CPU 51 in the image sensor control circuit 58. The image sensor control circuit 58 performs control of the image sensor 57 according to the set continuous shooting interval $\Delta t$ and the set shutter release period $\Delta t'$. Accordingly, during continuous shooting, the image sensor 57 accumulates charge and outputs an analog value corresponding to the accumulated charge amount according to the shutter release period $\Delta t'$ for the continuous shooting interval $\Delta t$.

The front end unit 59 converts the analog value output from the image sensor 57 into digital data, and outputs the converted digital data. The DSP 60 converts the digital data output from the front end unit 59 into image data (hereinafter referred to as "photographed image data") expressed as colored spaces such as RGB, YCbCr, YUV, etc., and records the photographed image data in the memory 52. Note that the photographed image data includes information indicating a pixel value of pixels in the photographed images.

The frame interpolation circuit 61 generates image data of interpolation images to be interpolated in the non-photographing section (hereinafter referred to as "interpolation image data") with use of the photographed image data of photographed images recorded in the memory 52 of both photographing sections that are temporally adjacent to the non-photographing section, and records the generated interpolation image data in the memory 52. Note that the interpolation image data includes information indicating pixel values corresponding to the respective pixels of the photographed images.

The frame compositing circuit 62 generates composite images for each image compositing section so that, in each image compositing section, each pixel in each interpolation image substantially overlaps the corresponding pixel in the same position in the respective photographed image. Specifically, the frame compositing circuit 62, for each pixel, adds the photographed image data of the photographed image in the image compositing section recorded in the memory 52 to the interpolation image data of the interpolated images recorded in the memory 52. The frame compositing circuit 62 generates image data (hereinafter referred to as "composite image data") of the composite image by dividing the data obtained by adding by the total number of photographed images and interpolation images in the image compositing section. The frame compositing circuit 62 records the generated composite image data in the memory 52. Note that the composite image data includes information indicating pixel values corresponding to the respective pixels of the photographed images.

Note that the details of the processing performed by the frame interpolation circuit 61 for generating the interpolation images are described later with reference to FIG. 4. Also, the processing operations of the frame interpolation circuit 61 and the frame compositing circuit 62 from the photographed images to the generation of the composite images are described later with reference to FIGS. 5 and 6. A specific example of such processing is described later with reference to FIGS. 7 to 9.

The compression and expansion circuit 63 performs compression and expansion of data recorded in the memory 52 or the memory card 64. The compression and expansion circuit 63 records the data obtained by the processing in the memory 52 or the memory card 64.

Generation of Interpolation Images

Figure 4:
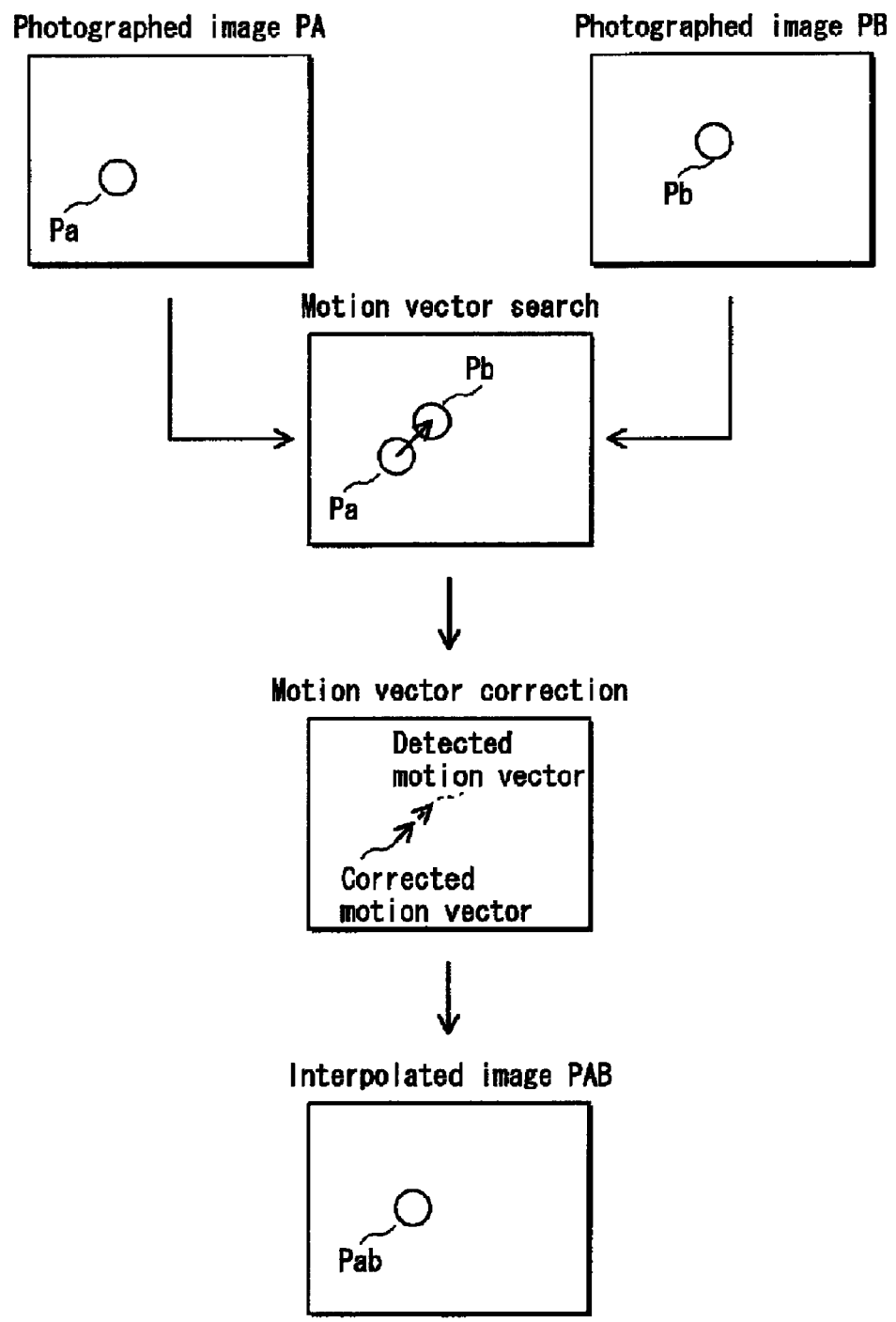
FIG. 4 illustrates processing to generate an interpolated image, performed by a frame interpolation circuit shown in FIG. 3.

The following describes the processing performed by the frame interpolation circuit 61 for generating the interpolation images, with reference to FIG. 4. FIG. 4 illustrates the processing performed by the frame interpolation circuit 61 of FIG. 3 for generating the interpolation images. Photographed images in continuous exposure sections are referred to as "PA" and "PB", the exposure sections are referred to as "PA" and "PB", the continuous shooting interval is referred to as $\Delta t$, and the shutter release period is referred to as $\Delta t'$. Note that the continuous shooting interval $\Delta t$ is longer than the shutter release period $\Delta t'$ ($\Delta t > \Delta t'$).

The frame interpolation circuit 61 calculates a number of interpolation images to interpolate in one non-photographing section (hereinafter referred to as a "number of interpolation images") with use of the continuous shooting interval $\Delta t$ and the shutter release period $\Delta t'$. For example, the frame interpolation circuit 61 calculates a duration $\Delta t - \Delta t'$ of the non-photographing section by subtracting the shutter release period $\Delta t'$ from the continuous shooting interval $\Delta t$. Next, the frame interpolation circuit 61 obtains a value that satisfies N (N being a positive integer) so that $(N-1) \times \Delta t' < \Delta t - \Delta t' \leq N \times \Delta t'$, and sets the obtained N as the number of interpolation images.

When the duration of the non-photographing section is N times the duration of the exposure section (N being a positive integer), the frame interpolation circuit 61 sets the number of interpolation images for interpolating in one non-photographing section as N, and generates N interpolation images. Also, when the duration of the non-photographing section is not a positive integral multiple of the duration of the exposure section, the frame interpolation circuit 61 obtains a positive integer N such that (N−1) times the duration of the exposure section is less times the duration of the exposure section is larger than the duration of the non-photographing section, and generates N interpolation images. Furthermore, when the continuous shooting interval $\Delta t$ is equivalent to the shutter release period $\Delta t'$ ($\Delta t = \Delta t'$), the frame interpolation circuit 61 obtains 0 as the number N of interpolation images, and does not generate any interpolation images.

The frame interpolation circuit 61 performs a motion estimation with use of the photographed images PA and PB, and finds a portion that has moved by comparing the photographed image PA and the photographed image PB. A method of detecting a portion in which an absolute sum of the difference of each rectangular area used in MPEG (Moving Picture Experts Group), etc. is smallest, and estimating a motion vector of the rectangular area based on the size of the absolute sum of the difference, is used as a method of performing the motion estimation. Note that in the example of FIG. 4, for example, the portion Pa of the photographed image PA corresponds to the portion Pb of the photographed image PB.

Next, when n is greater than or equal to 1, and less than or equal to N, the frame interpolation circuit 61 performs correction of the motion vector by multiplying the detected motion vector by n/(N+1). The frame interpolation circuit 61 determines the position of the moving portion in the interpolation image to be the position indicated by the corrected motion vector, and generates an interpolation image such that the moving portion arrives at the position indicated by the corrected motion vector. For example, the frame interpolation circuit 61 generates an interpolation image PAB by causing the moving portion Pa to arrive at the position indicated by the corrected motion vector corresponding to that portion, in other words, by causing the moving portion Pa to move to the portion Pab in FIG. 4. When the interpolation image PAB is generated from the photographed images PA and PB in the shutter release period Δt', the interpolation image PAB corresponds to the image for which the shutter release period is Δt'.

Note that the generation of interpolation images is not limited to the above technique, and there is no particular limitation on the type of technique, provided that interpolation images can be generated thereby.

Operation of the Photographing Device

The following describes continuous shooting processing and image compositing processing performed by the photographing device 1 of FIG. 3.

Photographing Processing

The following describes the continuous shooting processing performed by the photographing device 1 of FIG. 3.

When the continuous shooting mode switch 3 is moved to a position indicating a continuous shooting mode by an operation of the user, the CPU 51 sets the continuous shooting interval Δt and the shutter release period Δt' in the image sensor control circuit 58, and performs adjustment of the aperture 53c by controlling the aperture drive circuit 56.

When the photographing button 2 is pressed by the user, the CPU 51 instructs the image sensor control circuit 58 to start photographing, and the image sensor 57, controlled by the image sensor control circuit 58, accumulates charge and outputs an analog value corresponding to the accumulated charge amount according to the continuous shooting interval Δt and the shutter release period Δt'. The front end unit 59 converts the analog value output from the image sensor 57 into digital data and outputs the converted digital data. The DSP 60 converts the digital data output from the front end unit 59 into photographed image data expressed as colored spaces, and records the converted photographed digital data in the memory 52. This processing is performed until the time when the CPU 51 instructs the image sensor control circuit 58 to end photographing, due to the user releasing the photographing button 2, or the memory 52 becoming full.

According to this processing, the photographed image data of the plurality of photographed images shot by continuous shooting at the continuous shooting interval Δt and the shutter release period Δt' is recorded in the memory 52. Since the continuous shooting interval Δt and the shutter release period Δt' are used when generating the composite images from the photographed images, the continuous shooting interval Δt and the shutter release period Δt' are recorded in correspondence with the group of photographed image data in the memory 52.

Image Compositing Processing

Figure 5:
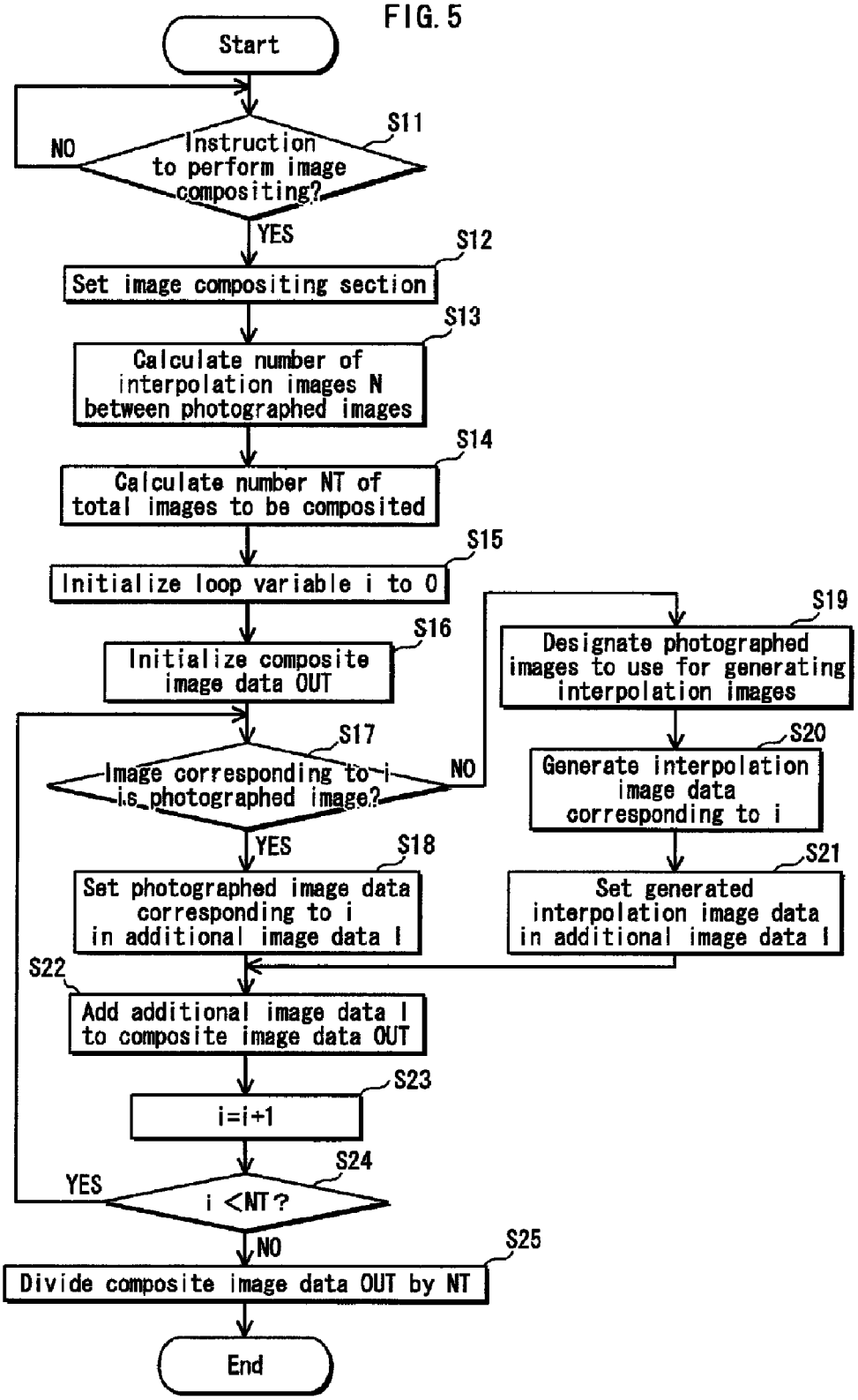
FIG. 5 is a flowchart showing a flow of image compositing processing performed by the photographing device of FIG. 3.

The following describes image compositing processing performed by the photographing device 1 of FIG. 3 with reference to FIG. 5. FIG. 5 is a flowchart showing a flow of image compositing processing performed by the photographing device 1 of FIG. 3.

The CPU 51 judges whether a user has performed an instruction operation to perform image compositing with use of the function button 7, the center key 8a, or the up, down, left, and right directional push-keys 8b to 8e (step S11). The CPU 51 performs the processing of step S11 until the user has performed an instruction operation to perform image compositing (S11:NO).

Figure 6:
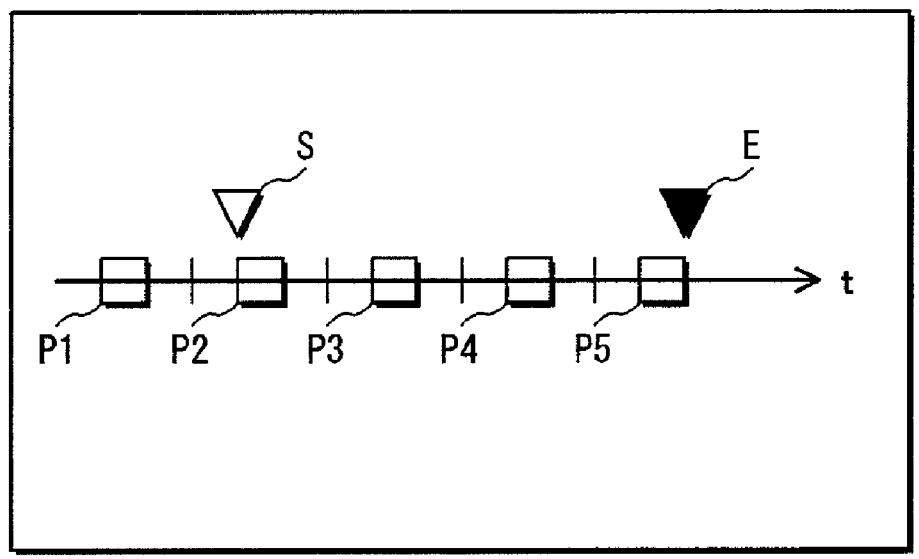
FIG. 6 shows an example of a GUI for setting a compositing start position and a compositing end position, displayed in the image compositing processing of FIG. 5.

Meanwhile, when the user performs an instruction operation to perform image compositing (S11:YES), the CPU 51 receives, from the user, a start position and an end position of the image compositing section, and sets the start position and the end position of the image compositing section received from the user in the frame compositing circuit 62 (step S12). Receiving the start position and the end position of the image compositing section from the user is, for example, performed by displaying a GUI, an example of which is shown in FIG. 6, for specifying the start position and end position of the image compositing section, on the liquid crystal monitor 9, and receiving a user operation with use of this GUI. In FIG. 6, P1 to P5 are icons of photographed images. S and E are pointers for specifying the start position and the end position of the image compositing section, respectively. The GUI shown as an example in FIG. 6 is configured so that the icons of the photographed images are shown on a time axis, and when the user specifies an icon from among the shown icons, the corresponding photographed image is displayed. The user can specify the start position and end position of the image compositing section by causing the pointers S and E to move. Note that the method of setting the start position and end position of the image compositing section is not limited to this, and may be, for example, a method of designating that photographed images from an xth image to an yth image are to be composited, when x and y are both integers.

The frame interpolation circuit 61 calculates a number of interpolation images N for interpolating in one non-photographing section, in accordance with the continuous shooting interval Δt and the shutter release period Δt' recorded in the memory 52 (step S13).

The frame compositing circuit 62 calculates a total number of photographed images and interpolation images on which to perform image compositing (hereinafter referred to as a "number of composite images"), with use of the start position and end position of the image compositing section set in step S12, and the number of interpolation images N calculated in step S13 (step S14). For example, designating a number of interpolation images before the first photographed image in the image compositing section to be NA, a number of photographed images in the image compositing section to be NB, a number of interpolation images to interpolate in one non-photographing section to be NC (the N obtained by the calculation in step S13), and a number of interpolation images after the last photographed image in the image compositing section to be ND, the total number NT is NA+NB+NC×(NB−1)+ND. Note that when the user-designated start position or end position do not match the start position or end position of the photographed images and the interpolation images, the start position or end position of the image compositing section is corrected to match the start position or end position of the photographed images and the interpolation images.

The frame compositing circuit 62 initializes a loop variable i to zero (step S15), and clears to zero and initializes a composite image data OUT (step S16). The composite image data OUT indicates values of pixels corresponding to the pixels in the photographed image. Note that the photographed images and the interpolation images in the image compositing section are, in a time order from earliest to latest, images for which the loop variable i is 0, 1, 2, . . . , NT−1.

The frame compositing circuit 62 judges whether the image corresponding to the loop variable i (hereinafter referred to as an "image i") is a photographed image (step S17). If the image i corresponds to a photographed image (step S17:YES), the frame compositing unit 62 sets the photographed image data of the image i as additional image data I (step S18), adds the additional image data I to the composite image data OUT, and updates the composite image data OUT by setting the result of the addition to the composite image data OUT (step S22). Note that the processing of adding the composite image data OUT and the additional image data I is performed so that, in the images (the photographed images and the interpolation images), the pixel values of pixels in the same position are added together.

Meanwhile, if the image i does not correspond to a photographed image, in other words, corresponds to an interpolation image (S17:NO), the frame interpolation circuit 61 designates a non-photographing section targeted for interpolating the image i, and designates the photographed images of both exposure sections temporally adjacent to the designated non-photographing section (step S19). The frame interpolation circuit 61 generates interpolation image data of the interpolation images corresponding to the image i with use of the photographed image data of the two photographed images for generating the interpolation image which were designated in step S19, and records the generated interpolation image data in the memory 52 (step S20). Note that the processing of step S20 is performed after an assessment is made as to which number the image i is of the images to be interpolated in the non-photographing section targeted for interpolation.

The frame compositing circuit 62 sets the interpolation image data of the interpolation image generated in step S20 as the additional image data I (step S21). The frame compositing circuit 62 adds the additional image data I to the composite image data OUT, and updates the composite image data OUT by setting the result of the addition to the composite image data OUT (step S22). Note that the processing of adding the composite image data OUT and the additional image data I is performed so that, in the images (the photographed images and the interpolated images), pixel values of pixels in the same position are added together.

The frame compositing circuit 62 adds 1 to the loop variable i (step S23), and judges whether the loop variable i after adding 1 is less than the number of composite images NT (step S24). If the loop variable i is less than the number of composite images NT (S24:YES), since the addition of all the photographed images and interpolation images in the image compositing section is not finished, the processing of S17 is performed. Meanwhile, if the loop variable i is not less than the number of composite images NT (S24:NO), since the addition of all the photographed images and interpolation images in the image compositing section is finished, the frame compositing circuit 62 divides the values corresponding to the pixels of the composite image data OUT by the number of composite images NT, updates the composite image data OUT by setting the result of the division to the composite image data OUT, and records the updated composite image data OUT in the memory 52 (step S25).

In this way, since composite images are generated with use of interpolation images in addition to photographed images, the composite images approximate still images photographed when the duration of the image compositing section is set as the shutter release period.

EXAMPLE OF IMAGE COMPOSITING PROCESSING

Figure 7:
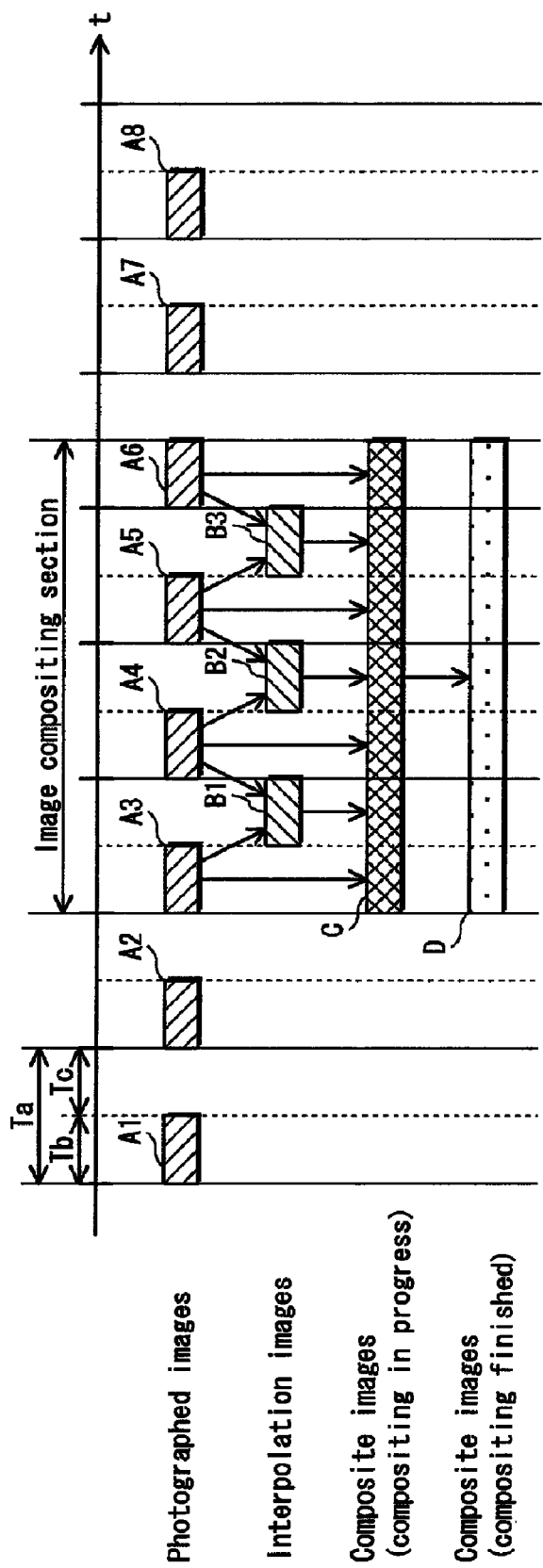
FIG. 7 shows an example of image compositing processing performed by the photographing device of FIG. 3.
Figure 8:
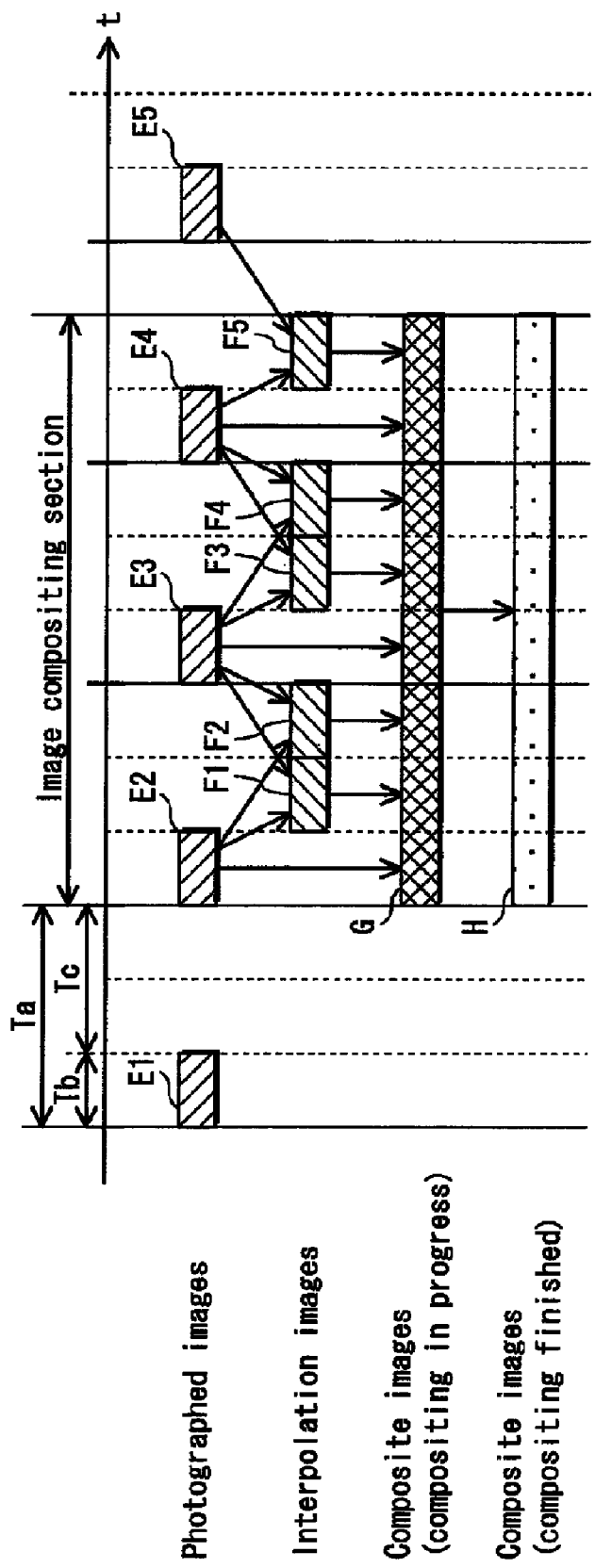
FIG. 8 shows another example of image compositing processing performed by the photographing device of FIG. 3.
Figure 9:
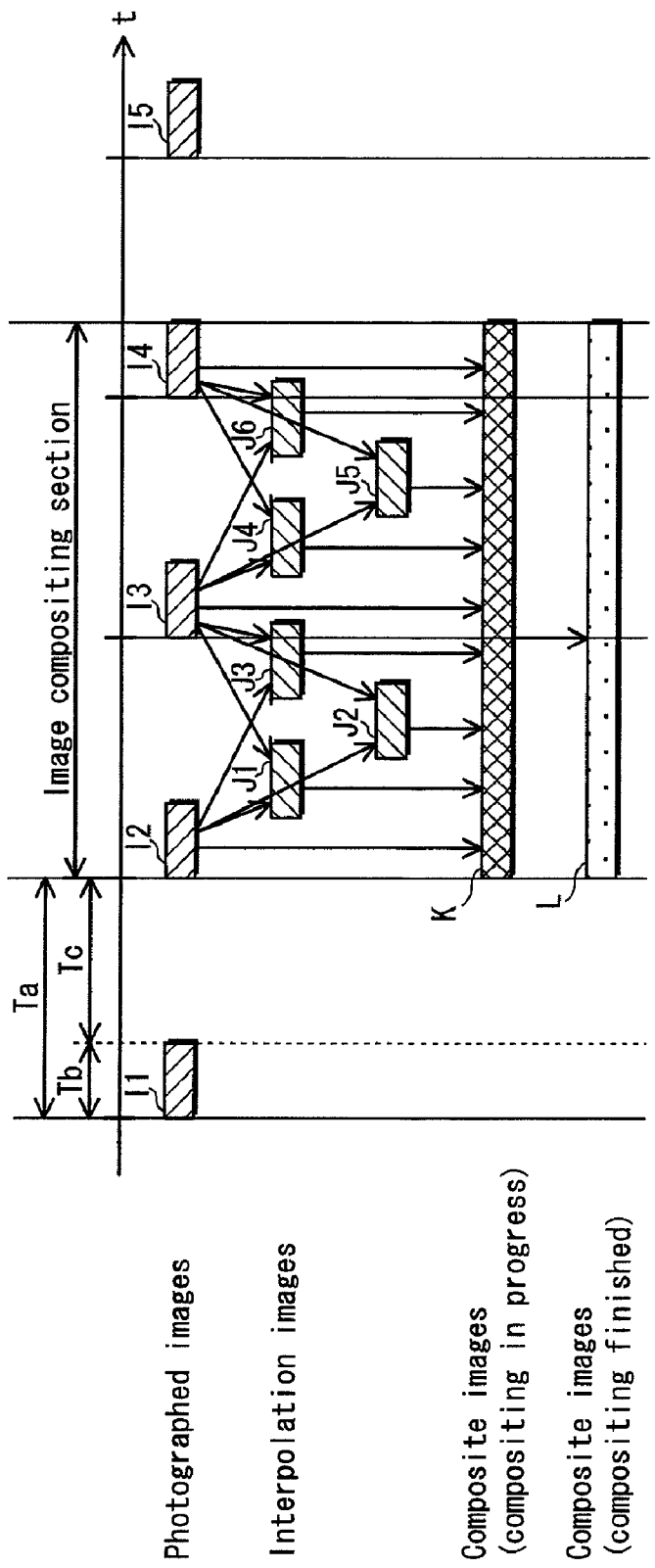
FIG. 9 shows a further example of image compositing processing performed by the photographing device of FIG. 3.

The following describes an example of the image compositing processing performed by the photographing device 1 of FIG. 3 with reference to FIGS. 7 to 9. The duration of the continuous shooting interval is Ta, the duration of the exposure section is Tb, and the duration of the non-photographing section is Tc.

Image Compositing Processing (Example 1)

FIG. 7 shows an example of image compositing processing performed by the photographing device 1 when the duration Ta of the continuous shooting interval is an integral multiple of the duration Tb of the exposure section. The duration Ta of the continuous shooting interval is twice the duration Tb of the exposure section (Ta=2Tb), and the image compositing section is as shown in FIG. 7. Note that in the present example, the duration of the non-photographing section is the same as the duration of the exposure section (Tb=Tc).

The CPU 51 sets a start position and an end position of the image compositing section in the frame compositing circuit 62 (steps S11, S12). The frame interpolation circuit 61 calculates a number N of interpolation images to be interpolated in one non-photographing section, and here, N=1 (step S13). Also, the frame compositing circuit 62 calculates the total number NT of photographed images and interpolation images (number of composite images), and here, NT=7 (step S14). The frame compositing circuit 62 initializes the loop variable i and the composite image data OUT (steps S15, S16).

Since the image corresponding to the value "0" of the loop variable is a photographed image A3 (step S17:YES), the frame compositing circuit 62 updates the composite image data OUT by adding the photographed image data of the photographed image A3 to the composite image data OUT as the additional image data I (steps S18, S22).

Next, the frame compositing circuit 62 judges that the value of the loop variable i after adding 1, "1", is less than the number of composite images, "7" (step S23, step S24:YES). Since the image corresponding to the value "1" of the loop variable is not a photographed image (step S17:NO), the frame interpolation circuit 61 generates interpolation image data of an interpolation image B1 from the photographed image data of the photographed images A3 and A4 (step S19, step S20). The frame composite circuit 62 updates the composite image data OUT by adding the interpolation image data of the interpolation image B1 to the composite image data OUT as the additional image data I (step S21, step S22).

Next, the frame compositing circuit 62 judges that the value of the loop variable i after adding 1, "2"1, is less than the number of composite images, "7" (step S23, step S24:YES) Since the image corresponding to the value "2" of the loop variable is the photographed image A4 (step S17:YES), the frame compositing circuit 62 updates the composite image data OUT by adding the photographed image data to the composite image data OUT as the additional image data I (step S18, step S22).

Next, the frame compositing circuit 62 judges that the value of the loop variable i after adding 1, "3", is less than the number of composite images, "7" (step S23, step S24:YES). Since the image corresponding to the value "3" of the loop variable is not a photographed image (step S17:NO), the frame interpolation circuit 61 generates interpolation image data of an interpolation image B2 from the photographed image data of the photographed images A4 and A5 (step S19, step S20). The frame composite circuit 62 updates the composite image data OUT by adding the interpolation image data of the interpolation image B2 to the composite image data OUT as the additional image data I (step S21, step S22).

Next, the frame compositing circuit 62 judges that the value of the loop variable i after adding 1, "4", is less than the number of composite images, "7" (step S23, step S24:YES). Since the image corresponding to the value "4" of the loop variable is the photographed image A5 (step S17:YES), the frame compositing circuit 62 updates the composite image data OUT by adding the photographed image data of the photographed image A5 to the composite image data OUT as the additional image data I (step S18, step S22).

Next, the frame compositing circuit 62 judges that the value of the loop variable i after adding 1, "5", is less than the number of composite images, "7" (step S23, step S24:YES). Since the image corresponding to the value "5" of the loop variable is not a photographed image (step S17:NO), the frame interpolation circuit 61 generates interpolation image data of an interpolation image B3 from the photographed image data of the photographed images A5 and A6 (step S19, step S20). The frame composite circuit 62 updates the composite image data OUT by adding the interpolation image data of the interpolation image B3 to the composite image data OUT as the additional image data I (step S21, step S22).

Next, the frame compositing circuit 62 judges that the value of the loop variable i after adding 1, "6", is less than the number of composite images, "7" (step S23, step S24:YES). Since the image corresponding to the value "6" of the loop variable is the photographed image A6 (step S17:YES), the frame compositing circuit 62 updates the composite image data OUT by adding the photographed image data of the photographed image A6 to the composite image data OUT as the additional image data I (step S18, step S22). Note that the image of the composite image data OUT is the composite image C in FIG. 7.

Next, the frame compositing circuit 62 judges that the value of the loop variable i after adding 1, "7", is not less than the number of composite images, "7" (step S23, step S24: NO). The frame compositing circuit 62 updates the composite data OUT by dividing the composite data OUT of the composite image C by the total number of images, "7" (step S25) Note that the image of the composite image data OUT is the composite image D in FIG. 7.

In the present example, there are no composite images missing from the times in the image compositing section, there are no composite images having duplicate periods, and the composite images are images on a par with still images for which the shutter release period is the same as the duration of the image compositing section.

Image Compositing Processing (Example 2)

FIG. 8 shows another example of image compositing processing performed by the photographing device 1 when the duration Ta of the continuous shooting interval is an integral multiple of the duration Tb of the exposure section.

The duration Ta of the continuous shooting interval is three times the duration Tb of the exposure section (Ta=3Tb), and the image compositing section is as shown in FIG. 8. Note that in the present example, the duration of the non-photographing section is twice the duration of the exposure section (2Tb=Tc).

The CPU 51 sets a start position and an end position of the image compositing section in the frame compositing circuit 62 (steps S11, S12). The frame interpolation circuit 61 calculates a number N of interpolation images to be interpolated in one non-photographing section, and here, N=2 (step S13).

Also, the frame compositing circuit 62 calculates the total number NT of photographed images and interpolation images (number of composite images), and here, NT=8 (step S14). The frame compositing circuit 62 initializes the loop variable i and the composite image data OUT (steps S15, S16).

Since the image corresponding to the value "0" of the loop variable is the photographed image E2 (step S17: YES), the frame compositing circuit 62 updates the composite image data OUT by adding the photographed image data of the photographed image E2 to the composite image data OUT as the additional image data I (steps S18, S22).

Next, the frame compositing circuit 62 judges that the value of the loop variable i after adding 1, "1", is less than the number of composite images, "8" (step S23, step S24:YES). Since the image corresponding to the value "1" of the loop variable is not a photographed image (step S17:NO), the frame interpolation circuit 61 generates interpolation image data of an interpolation image F1 from the photographed image data of the photographed images E2 and E3 (step S19, step S20). The frame composite circuit 62 updates the composite image data OUT by adding the interpolation image data of the interpolation image F1 to the composite image data OUT as the additional image data I (step S21, step S22).

Next, the frame compositing circuit 62 judges that the value of the loop variable i after adding 1, "2", is less than the number of composite images, "8" (step S23, step S24:YES). Since the image corresponding to the value "2" of the loop variable is not a photographed image (step S17:NO), the frame interpolation circuit 61 generates interpolation image data of an interpolation image F2 from the photographed image data of the photographed images E2 and E3 (step S19, step S20) The frame composite circuit 62 updates the composite image data OUT by adding the interpolation image data of the interpolation image F2 to the composite image data OUT as the additional image data I (step S21, step S22).

Next, the frame compositing circuit 62 judges that the value of the loop variable i after adding 1, "3", is less than the number of composite images, "8" (step S23, step S24:YES). Since the image corresponding to the value "3" of the loop variable is the photographed image E3 (step S17:YES), the frame compositing circuit 62 updates the composite image data OUT by adding the photographed image data of the photographed image E3 to the composite image data OUT as the additional image data I (step S18, step S22).

Next, the frame compositing circuit 62 judges that the value of the loop variable i after adding 1, "4", is less than the number of composite images, "8" (step S23, step S24:YES). Since the image corresponding to the value "4" of the loop variable is not a photographed image (step S17:NO), the frame interpolation circuit 61 generates interpolation image data of an interpolation image F3 from the photographed image data of the photographed images E3 and E4 (step S19, step S20). The frame composite circuit 62 updates the composite image data OUT by adding the interpolation image data of the interpolation image F3 to the composite image data OUT as the additional image data I (step S21, step S22).

Next, the frame compositing circuit 62 judges that the value of the loop variable i after adding 1, "5", is less than the number of composite images, "8" (step S23, step S24:YES). Since the image corresponding to the value "5" of the loop variable is not a photographed image (step S17:NO), the frame interpolation circuit 61 generates interpolation image data of an interpolation image F4 from the photographed image data of the photographed images E3 and E4 (step S19, step S20). The frame composite circuit 62 updates the composite image data OUT by adding the interpolation image data of the interpolation image F4 to the composite image data OUT as the additional image data I (step S21, step S22).

Next, the frame compositing circuit 62 judges that the value of the loop variable i after adding 1, "6", is less than the number of composite images, "8" (step S23, step S24:YES). Since the image corresponding to the value "6" of the loop variable is the photographed image E4 (step S17:YES), the frame compositing circuit 62 updates the composite image data OUT by adding the photographed image data of the photographed image E4 to the composite image data OUT as the additional image data I (step S18, step S22).

Next, the frame compositing circuit 62 judges that the value of the loop variable i after adding 1, "7", is less than the number of composite images, "8" (step S23, step S24:YES). Since the image corresponding to the value "7" of the loop variable is not a photographed image (step S17:NO), the frame interpolation circuit 61 generates interpolation image data of an interpolation image F5 from the photographed image data of the photographed images E4 and E5 (step S19, step S20). The frame composite circuit 62 updates the composite image data OUT by adding the interpolation image data of the interpolation image F5 to the composite image data OUT as the additional image data I (step S21, step S22). Note that the image of the composite image data OUT is the composite image G in FIG. 8.

Next, the frame compositing circuit 62 judges that the value of the loop variable i after adding 1, "8", is not less than the number of composite images, "8" (step S23, step S24: NO). The frame compositing circuit 62 updates the composite image data OUT by dividing the composite data OUT of the composite image G by the total number of composite images, "8" (step S25). Note that the image of the composite image data OUT is the composite image H in FIG. 8.

In the present example there are no composite images missing from the times in the image compositing section, there are no composite images having duplicate periods, and the composite images are images on a par with still images for which the shutter release period is the same as the duration of the image compositing section.

Image Compositing Processing (Example 3)

FIG. 9 shows an example of image compositing processing performed by the photographing device 1 when the duration Ta of the continuous shooting interval is not an integral multiple of the duration Tb of the exposure section. The duration Ta of the continuous shooting interval Ta is more than three times larger than the duration Tb of the exposure section, and is less than four times larger (3Tb<Ta<4Tb). The image compositing section is as shown in FIG. 9. Note that in the present example, the duration Tc of the non-photographing section is more than two times larger than the duration Tb of the exposure section, and is less than 3 times larger (2Tb<Tc<3Tb).

The CPU 51 sets a start position and an end position of the image compositing section in the frame compositing circuit 62 (steps S11, S12). The frame interpolation circuit 61 calculates a number N of interpolation images for interpolating in one non-photographing section, and here, N=3 (step S13). Also, the frame compositing circuit 62 calculates the total number NT of photographed images and interpolation images (number of composite images), and here, NT=9 (step S14). The frame compositing circuit 62 initializes the loop variable i and the composite image data OUT (steps S15, S16).

Since the image corresponding to the value "0" of the loop variable is a photographed image I2 (step S17:YES), the frame compositing circuit 62 updates the composite image data OUT by adding the photographed image data of the photographed image I2 to the composite image data OUT as the additional image data I (steps S18, S22).

Next, the frame compositing circuit 62 judges that the value of the loop variable i after adding 1, "1", is less than the number of composite images, "9" (step S23, step S24:YES). Since the image corresponding to the value "1" of the loop variable is not a photographed image (step S17:NO), the frame interpolation circuit 61 generates interpolation image data of an interpolation image J1 from the photographed image data of the photographed images I2 and I3 (step S19, step S20). The frame composite circuit 62 updates the composite image data OUT by adding the interpolation image data of the interpolation image J1 to the composite image data OUT as the additional image data I (step S21, step S22).

Next, the frame compositing circuit 62 judges that the value of the loop variable i after adding 1, "2", is less than the number of composite images, "9" (step S23, step S24:YES). Since the image corresponding to the value "2" of the loop variable is not a photographed image (step S17:NO), the frame interpolation circuit 61 generates interpolation image data of an interpolation image J2 from the photographed image data of the photographed images I2 and I3 (step S19, step S20). The frame composite circuit 62 updates the composite image data OUT by adding the interpolation image data of the interpolation image J2 to the composite image data OUT as the additional image data I (step S21, step S22).

Next, the frame compositing circuit 62 judges that the value of the loop variable i after adding 1, "3", is less than the number of composite images, "9" (step S23, step S24:YES). Since the image corresponding to the value "3" of the loop variable is not a photographed image (step S17:NO), the frame interpolation circuit 61 generates interpolation image data of an interpolation image J3 from the photographed image data of the photographed images I2 and I3 (step S19, step S20). The frame composite circuit 62 updates the composite image data OUT by adding the interpolation image data of the interpolation image J3 to the composite image data OUT as the additional image data I (step S21, step S22).

Next, the frame compositing unit 62 judges that the value of the loop variable i after adding 1, "4", is less than the number of composite images, "9" (step S23, step S24:YES). Since the image corresponding to the value of the loop variable "4" is the photographed image I3 (step S17:YES), the frame compositing circuit 62 updates the composite image data OUT by adding the photographed image data of the photographed image E2 to the composite image data OUT as the additional image data I (steps S18, S22).

Next, the frame compositing circuit 62 judges that the value of the loop variable i after adding 1, "5", is less than the number of composite images, "9" (step S23, step S24:YES). Since the image corresponding to the value "5" of the loop variable is not a photographed image (step S17:NO), the frame interpolation circuit 61 generates interpolation image data of an interpolation image J4 from the photographed image data of the photographed images I3 and I4 (step S19, step S20). The frame composite circuit 62 updates the composite image data OUT by adding the interpolation image data of the interpolation image. J4 to the composite image data OUT as the additional image data I (step S21, step S22).

Next, the frame compositing circuit 62 judges that the value of the loop variable i after adding 1, "6", is less than the number of composite images, "9" (step S23, step S24:YES). Since the image corresponding to the value "6" of the loop variable is not a photographed image (step S17:NO), the frame interpolation circuit 61 generates interpolation image data of an interpolation image J5 from the photographed image data of the photographed images I3 and I4 (step S19, step S20). The frame composite circuit 62 updates the composite image data OUT by adding the interpolation image data of the interpolation image J5 to the composite image data OUT as the additional image data I (step S21, step S22).

Next, the frame compositing circuit 62 judges that the value of the loop variable i after adding 1, "7", is less than the number of composite images, "9" (step S23, step S24:YES). Since the image corresponding to the value "7" of the loop variable is not a photographed image (step S17:NO), the frame interpolation circuit 61 generates interpolation image data of an interpolation image J6 from the photographed image data of the photographed images I3 and I4 (step S19, step S20). The frame composite circuit 62 updates the composite image data OUT by adding the interpolation image data of the interpolation image J6 to the composite image data OUT as the additional image data I (step S21, step S22).

Next, the frame compositing unit 62 judges that the value of the loop variable i after adding 1, "8", is less than the number of composite images, "9" (step S23, step S24:YES). Since the image corresponding to the value of the loop variable "8" is the photographed image I4 (step S17:YES), the frame compositing circuit 62 updates the composite image data OUT by adding the photographed image data of the photographed image I4 to the composite image data OUT as the additional image data I (steps S18, S22). Note that the image of the composite image data OUT is the composite image K in FIG. 9.

Next, the frame compositing circuit 62 judges that the value of the loop variable i after adding 1, "9", is not less than the number of composite images, "9" (step S23, step S24: NO). The frame compositing circuit 62 updates the composite image data OUT of the composite image K by dividing the composite image data OUT by the total number of composite images, "9" (step S25). Note that the image of the composite image data OUT is the composite image L in FIG. 9.

In the present example, in the composite images, although the photographed images and the interpolation images are partially duplicated, and the interpolation images also partially duplicate each other, there are no composite images missing from the times in the image compositing section, and the composite images are images that closely resemble still images for which the shutter release period is the same as the duration of the image compositing section.

Embodiment 2

The following describes embodiment 2 of the present invention with reference to the drawings. A photographing device 1a of the present embodiment is the same as the photographing device 1 of embodiment 1 with the addition of a function of adjusting the continuous shooting interval Δt and the shutter release period Δt' so that the continuous shooting interval Δt is a positive integral multiple of the shutter release period Δt'. Note that in the photographing device 1a, the duration of the non-photographing section may be any positive integral multiple of the duration of the exposure section, provided that the continuous shooting interval Δt is not equal to the shutter release period Δt'.

The photographing device 1a generates composite images from photographed images by performing substantially the same image compositing processing as the image compositing processing performed by the photographing device 1 (see FIG. 5).

Functional Structure of Photographing Device

Figure 10:
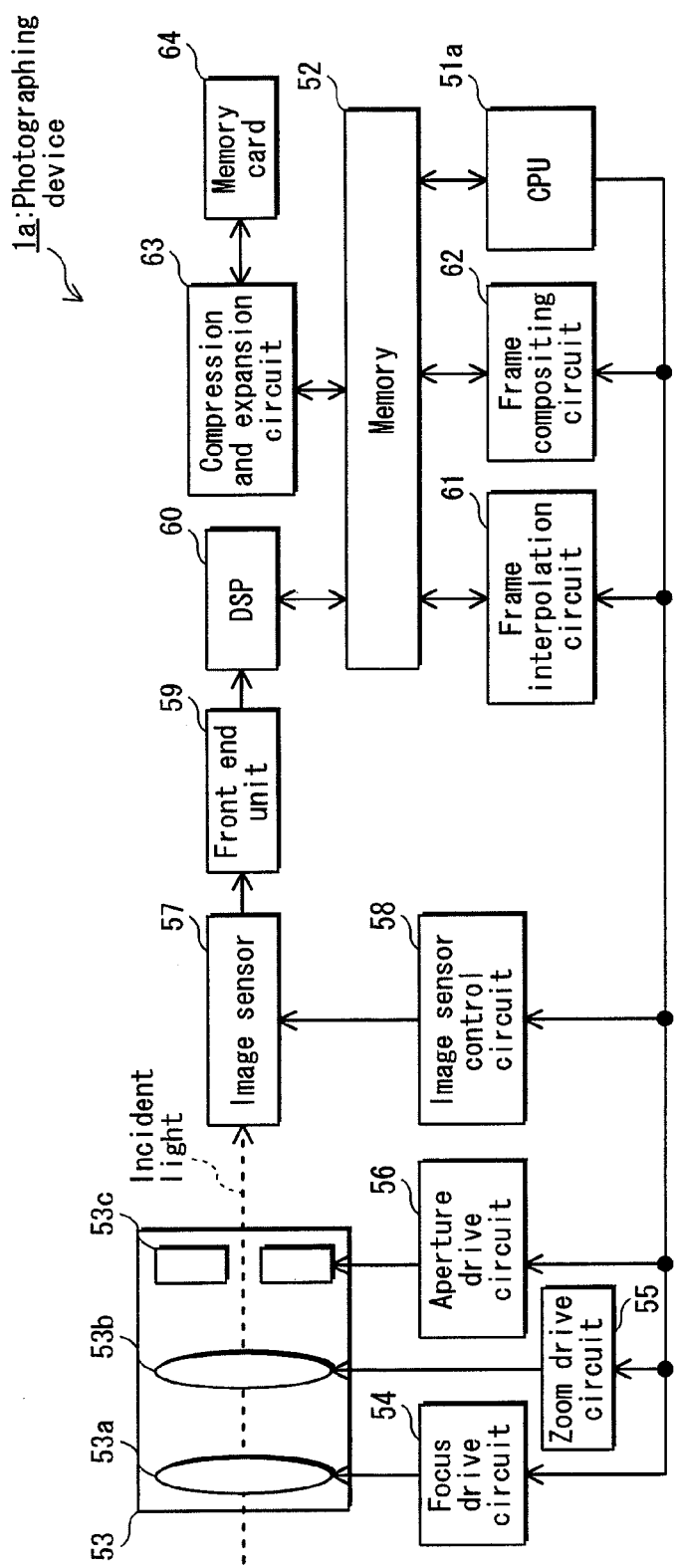
FIG. 10 is a functional block diagram of the photographing device of embodiment 2.

The following describes the functional structure of the photographing device 1 of the present embodiment with reference to FIG. 10. FIG. 10 is a functional block diagram of the photographing device 1a of the present embodiment. Note that in the present embodiment, constituent elements having substantially the same functions as those in embodiment 1 have been given the same reference symbols, and since the description in embodiment 1 is applicable, such description is omitted in the present embodiment.

The CPU 51a of the photographing device 1a determines the continuous shooting interval Δt and the shutter release period Δt' so that the continuous shooting interval Δt is a positive integral multiple of the shutter release period Δt', and also determines an aperture size value of an aperture 53c. The CPU 51a performs control of the aperture drive circuit 56 so that the aperture size value is the determined aperture size value. Also, the CPU 51a performs control of the image sensor control circuit 58 so that continuous shooting is performed in the determined continuous shooting interval Δt and shutter release period Δt'.

Operation of the Photographing Device

Figure 11:
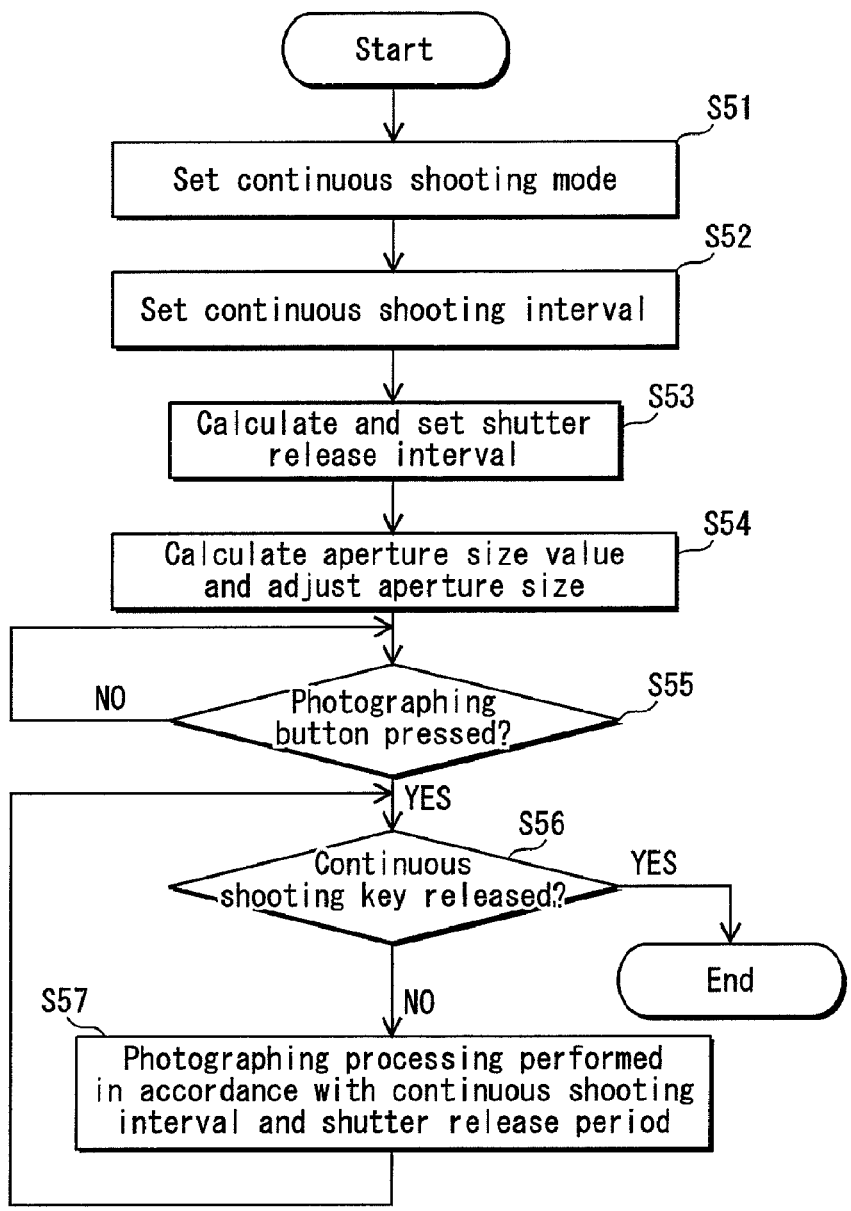
FIG. 11 is a flowchart showing a flow of continuous shooting processing performed by the photographing device of FIG. 10.

The following describes the continuous shooting processing performed by the photographing device 1a of FIG. 10 with reference to FIG. 11. FIG. 11 is a flowchart showing a flow of continuous shooting processing performed by the photographing device 1a of FIG. 10. The CPU 51a reads a program, in which the operation flow shown in FIG. 11 is written, from the memory 52, and executes the read program. Note that the user specifies the continuous shooting interval Δt, and the CPU 51a determines the shutter release period Δt' so that the determined continuous shooting interval Δt is a positive integral multiple of the shutter release period Δt'.

When the continuous shooting mode switch 3 is moved to the continuous shooting mode position by the operation of the user, the CPU 51a sets the photographing mode of the photographing device 1a to continuous shooting mode (step S51). To receive a specification of the continuous shooting interval Δt from the user, the CPU 51a displays a GUI, an example of which is shown in FIG. 12, on the liquid crystal monitor 9. The user specifies the continuous shooting interval Δt with use of an input area 9a on the GUI, and the CPU 51a sets the continuous shooting interval Δt specified by the user in the image control circuit 58 (step S52).

The CPU 51a designates an allowed range for the shutter release period based on a current amount of light. The CPU 51a obtains a shutter release period Δt', which is in the specified range for the shutter release period, such that the continuous shooting interval Δt specified by the user is a positive integral multiple of the shutter release period Δt'. The CPU 51a sets the obtained shutter release period Δt' in the image sensor control circuit 58 (step S53). The CPU 51a obtains an aperture size value corresponding to the shutter release period Δt' obtained in step S53, with use of the relationship, recorded in the memory 52, between the shutter release period corresponding to the current amount of light, and the aperture size value, performs control of the aperture drive circuit 56 according to the obtained aperture size value, and adjusts the size of the aperture 53c accordingly (step S54).

The CPU 51 judges whether the photographing button 2 has been pressed (step S55), and performs the processing of step S55 until the photographing button 2 is pressed (S55: NO). When the photographing button 2 has been pressed (S55:YES), while the photographing button 2 is being pressed (S56:NO), the image sensor control circuit 58 controlled by the CPU 51a controls the image sensor 57 so that the image sensor 57 repeatedly accumulates charge and outputs an analog value corresponding to the accumulated charge amount, according to the continuous shooting interval Δt and the shutter release period Δt'. Accordingly, the accumulation of charge and the output of the analog value corresponding to the accumulated charge amount are repeatedly performed according to the continuous shooting interval Δt and the shutter release period Δt'. The analog value output from the image sensor 57 is converted to digital data by the front end unit 59, the digital data output by the front end unit 59 is converted to photographed image data expressed as the colored spaces of the DSP 60, and the photographed image data is recorded in the memory 52 (step S57). When the photographing button 2 is released (S56:YES), the photographing device 1a ends the continuous shooting processing. Note that in the operational flow of FIG. 11, although continuous shooting processing is performed while the photographing button 2 is being pressed, the continuous shooting processing may also be configured to end when the memory 52 becomes full.

In the present embodiment, the frame interpolation circuit 61 and the frame compositing circuit 62 performs compositing image processing as described above with use of a plurality of photographed images (see FIG. 5).

In the present embodiment, since either a non-photographing section is not present, or the duration of the non-photographing section is an integral multiple of the duration of the exposure section, sufficient composite images can be obtained so that there are no times for which images are missing in the image compositing section, and there are no duplicate periods.

Supplementary Remarks

The present invention is not limited to the content described in the embodiments above, and may be implemented in any form that achieves the aim of the present invention or an aim that is related to or associated with the aim of the present invention, and may for example be as follows.

(1) Although in the embodiments described above, the frame interpolation circuit 61 and the frame compositing circuit 62 are inside the photographing devices 1 and 1a, the present invention is not limited to this, and the frame interpolation circuit 61 and the frame compositing circuit 62 may be included in a separate device other than the photographing device. Note that, for example, the separate device may be connected to the photographing device by a wired connection, and the separate device may be configured to obtain the photographed image data of the plurality of photographed images shot by continuous shooting from the photographing device.

(2) Although in the embodiments described above, when the continuous shooting interval is Δt and the shutter release period is Δt', the frame interpolation circuit 61 generates N interpolation images (N being a positive integer) so that N satisfies $(N-1) \times \Delta t' < \Delta t - \Delta t' \leq N \times \Delta t'$, the present invention is not limited to this, and for example, a number such as the following number of interpolation images may be generated.

In the above-described embodiments, when the duration of the non-photographing section is N times the duration of the photographing section (N being a positive integer) the frame interpolation circuit 61 may be configured to generate a number of interpolation images that is more than N, or may be configured to generate a number of interpolation images that is less than N.

In the above-described embodiment 1, when the duration of the non-photographing section is not an integral multiple of the duration of the photographing section, the frame interpolation circuit 61 may be configured to generate N interpolation images (N being a positive integer), such that N satisfies $N \times \Delta t' < \Delta t - \Delta t'$, and in this case, composite images are obtained for which the images (photographed images and interpolation images) do not duplicate each other. In particular, when the frame interpolation circuit 61 is configured to generate a maximum N number of images (N being a positive integer) that satisfies $N \times \Delta t' < \Delta t - \Delta t'$, the images (the photographed images and the interpolation images) do not duplicate each other, thus enabling generating composite images so that few times are missing images.

Also, in the above-described embodiment 1, when the duration of the non-photographing section is not an integral multiple of the duration of the photographing section, the frame interpolation circuit 61 may be configured to generate N interpolation images (N being a positive integer) such that N satisfies $\Delta t - \Delta t' < (N-1) - \Delta t'$ (3) When generating interpolation images as described in embodiment 1 above, when the duration of the non-photographing section is not an integral multiple of the duration of the exposure section, the interpolation images may be generated so that the periods of the portions that duplicate each other in the images (the photographed images and the interpolation images) are equal to each other, or may be generated that the periods are not equal to each other.

(4) Although in the generation of interpolation images described in embodiment 1 above, one interpolation image is generated with use of two photographed images, the present invention is not limited to this, and for example, three or more photographed images may be used to generate one interpolation image. Also, an interpolation image may be generated from another interpolation image and a photographed image, such as generating the interpolation image J2 from the interpolation image J1 and the photographed image I3 in FIG. 9, or an interpolation image may be generated from two other interpolation images, such as generating the interpolation image J2 from the interpolation image J1 and the interpolation image J3.

(5) In embodiment 2 described above, the user specifies a continuous shooting interval Δt, and adjustment is performed so that the continuous shooting interval Δt is a positive integral multiple of the shutter release period Δt', by calculating a shutter release period Δt' such that the continuous shooting interval Δt a positive integral multiple of the shutter release period Δt'. However, the present invention is not limited to this, and for example the following variations are possible. The continuous shooting interval Δt maybe adjusted to be a positive integral multiple of the shutter release period Δt' by calculating the shutter release period Δt' corresponding to an aperture size value adjusted by the user, or by causing the user to specify the shutter release period Δt' and calculating a continuous shooting interval Δt that is a positive integral multiple of the shutter release period Δt'.

(6) A program in which the image compositing processing, described with reference to the operation flow of FIG. 5 in embodiment 1, is written may be stored in a memory. For example, the CPU may read and execute the program recorded in the memory, and the CPU may operate as a functional unit to execute the processing of the frame interpolation circuit 61 and the frame compositing circuit 62, etc. Also, the program may be written on a recording medium, and distributed.

A program in which the photographing processing, described in embodiment 2 with reference to the operational flow of FIG. 11, is written may be recorded on a recording medium, and distributed. Also, the processing content shown in the operational flow of FIG. 11 may be executed on a device other than the CPU 51a.

Note that the same is true for all of the variations.

(7) Structures such as those in the above embodiments may be realized as an LSI (Large Scale Integration) that is a typical integrated circuit. Each of the structures of the embodiments may be configured as a separate chip, or an entirety or a portion of the structures may be included on a single chip.

Also, here, although referred to as an LSI, an integrated circuit generated as described above may also be referred to as an IC (Integrated Circuit), a system LSI, a super LSI, or an ultra LSI, depending on the degree of integration.

Also, the method of integration is not limited to being LSI integration, but instead may be realized by a dedicated circuit or a general-purpose process. After LSI manufacture, the use of an FPGA (field programmable gate array) or a silicon flexible processor in which the connection and settings of circuit cells in the LSI can be restructured is possible.

Furthermore, if integration technology is developed that replaces LSIs due to progressive or derivative semiconductor technology, integration of functional blocks using this technology is naturally possible. For example, the application of biotechnology is a possibility.

Industrial Applicability

The present invention is useful for generation of composite images from photographed images shot by continuous shooting, when the exposure time is longer than the actual duration of exposure.

The invention claimed is:

1. An image compositing device that generates a composite image corresponding to a predetermined time section with use of a plurality of photographed images continuously shot at a predetermined time interval, the image compositing device comprising:
   an interpolation unit operable to determine, in accordance with (i) a duration of an exposure section in which exposure occurs and (ii) a duration of a non-photographing section that is between the exposure section and a next exposure section, a number of interpolation images to interpolate in the non-photographing section, and generate the determined number of interpolation images with use of photographed images in both exposure sections temporally adjacent to the non-photographing sections; and
   a compositing unit operable to generate a composite image corresponding to the predetermined time section with use of (i) one or more interpolation images, generated by the interpolation unit, to be interpolated in the predetermined time section and (ii) one or more photographed images photographed in the predetermined time section, so that respective pixels in a same position, in the one or more photographed images and the one or more interpolation images, substantially overlap with each other.

2. The image compositing device of claim 1, wherein
   the interpolation unit generates one or more interpolation images so that an entirety of the non-photographing section is provided with images.

3. The image compositing device of claim 2, wherein
   when the duration of the non-photographing section is N times (N being a positive integer) the duration of the exposure section,
   the interpolation unit generates N interpolation images.

4. The image compositing device of claim 2, wherein
   when the duration of the non-photographing section is not a positive integral multiple of the duration of the exposure section,
   the interpolation unit obtains a positive integer N such that (N−1) times the duration of the exposure section is smaller than the duration of the non-photographing section, and N times the duration of the exposure section is larger than the duration of the non-photographing section, and
   the interpolation unit generates N interpolation images.

5. The image compositing device of claim 1, wherein
   the interpolation unit performs the generation of the interpolation images by determining a position of a moving portion in an interpolation image to be generated, in accordance with (i) a position, in each of the photographed images of the both exposure sections, that indicates a moving portion that has moved from a position in one of the photographed images to another position in another of the photographed images, and (ii) the number of interpolation images to interpolate in the non-photographing section.

6. An image compositing method of generating a composite image corresponding to a predetermined time section with use of a plurality of photographed images continuously shot at a predetermined time interval, the image compositing method comprising:
   determining, in accordance with (i) a duration of an exposure section in which exposure occurs and (ii) a duration of a non-photographing section that is between the exposure section and a next exposure section, a number of interpolation images to interpolate in the non-photographing section, and generating the determined number of interpolation images with use of photographed images in both exposure sections temporally adjacent to the non-photographing section; and
   generating a composite image corresponding to the predetermined time section with use of (i) one or more interpolation images, generated by the interpolation unit, to be interpolated in the predetermined time section and (ii) one or more photographed images photographed in the predetermined time section, so that respective pixels in a same position, in the one or more photographed images and the one or more interpolation images, substantially overlap with each other.

7. A non-transitory computer readable recording medium having stored thereon an image compositing program that causes a computer, as an image compositing device that generates a composite image corresponding to a predetermined time section with use of a plurality of photographed images continuously shot at a predetermined time interval, to execute a method comprising:
   determining, in accordance with (i) a duration of an exposure section in which exposure occurs, and (ii) a duration of a non-photographing section that is between the exposure section and a next exposure section, a number of interpolation images to interpolate in the non-photographing section, and generating the determined number of interpolation images with use of photographed images in both exposure sections temporally adjacent to the non-photographing section; and
   generating a composite image corresponding to the predetermined time section with use of (i) one or more interpolation images, generated by the interpolation unit, to be interpolated in the predetermined time section and (ii) one or more photographed images photographed in the predetermined time section, so that respective pixels in a same position, in the one or more photographed images and the one or more interpolation images, substantially overlap with each other.

8. An integrated circuit that generates a composite image corresponding to a predetermined time section with use of a plurality of photographed images continuously shot at a predetermined time interval, the integrated circuit comprising:
   an interpolation unit operable to determine, in accordance with (i) a duration of an exposure section in which exposure occurs and (ii) a duration of a non-photographing section that is between the exposure section and a next exposure section, a number of interpolation images to interpolate in the non-photographing section, and generate the determined number of interpolation images with use of photographed images in both exposure sections temporally adjacent to the non-photographing section; and a compositing unit operable to generate a composite image corresponding to the predetermined time section with use of (i) one or more interpolation images, generated by the interpolation unit, to be interpolated in the predetermined time section and (ii) one or more photographed images photographed in the predetermined time section, so that respective pixels in a same position, in the one or more photographed images and the one or more interpolation images, substantially overlap with each other.

9. An imaging system comprising:

an imaging unit;

a control unit that controls continuous shooting by the imaging unit so that a time interval of performing the continuous shooting is a positive integral multiple of a duration of an exposure section in which exposure occurs;

an interpolation unit operable to determine, in accordance with (i) the duration of the exposure section in which exposure occurs and (ii) a duration of a non-photographing section that is between the exposure section and a next exposure section, a number of interpolation images to interpolate in the non-photographing section, and generate the determined number of interpolation images with use of photographed images in both exposure sections temporally adjacent to the non-photographing section; and a compositing unit operable to generate a composite image corresponding to a predetermined time section with use of (i) one or more interpolation images, generated by the interpolation unit, to be interpolated in the predetermined time section and (ii) one or more photographed images photographed in the predetermined time section, so that respective pixels in a same position, in the one or more photographed images and the one or more interpolation images, substantially overlap with each other.

10. An imaging method comprising:

controlling continuous shooting of an imaging unit so that a time interval of performing the continuous shooting is a positive integral multiple of a duration of an exposure section in which exposure occurs;

determining, in accordance with (i) the duration of the exposure section in which exposure occurs, and (ii) a duration of a non-photographing section that is between the exposure section and a next exposure section, a number of interpolation images to interpolate in the non-photographing section, and generate the determined number of interpolation images with use of photographed images in both exposure sections temporally adjacent to the non-photographing section; and generating a composite image corresponding to a predetermined time section with use of (i) one or more interpolation images, generated by the interpolation unit, to be interpolated in the predetermined time section and (ii) one or more photographed images photographed in the predetermined time section, so that respective pixels in a same position, in the one or more photographed images and the one or more interpolation images, substantially overlap with each other.

* * * * *